July 10, 1923.

G. H. JACKSON

TOBACCO LEAF MACHINE

Filed Dec. 24, 1921

1,461,529

2 Sheets-Sheet 1

WITNESS
G. V. Rasmussen

INVENTOR
GRAHAM H. JACKSON
BY
Briesen Schrenk
ATTORNEYS

July 10, 1923.
G. H. JACKSON
TOBACCO LEAF MACHINE
Filed Dec. 24, 1921
1,461,529
2 Sheets-Sheet 2
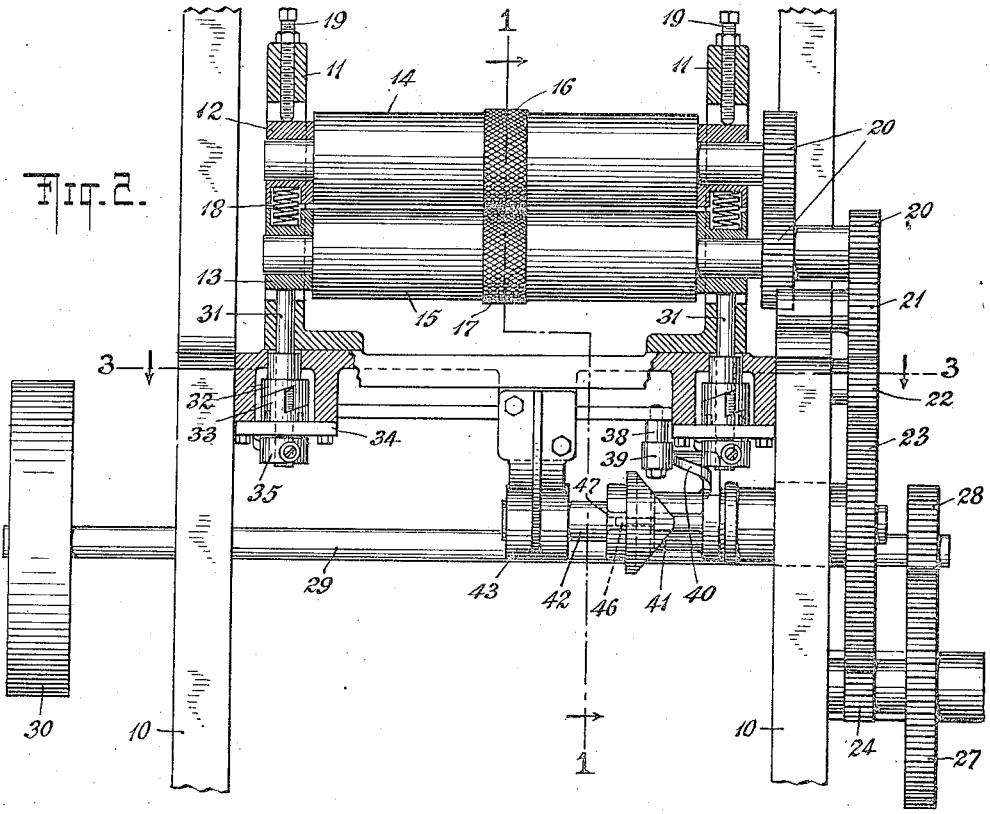
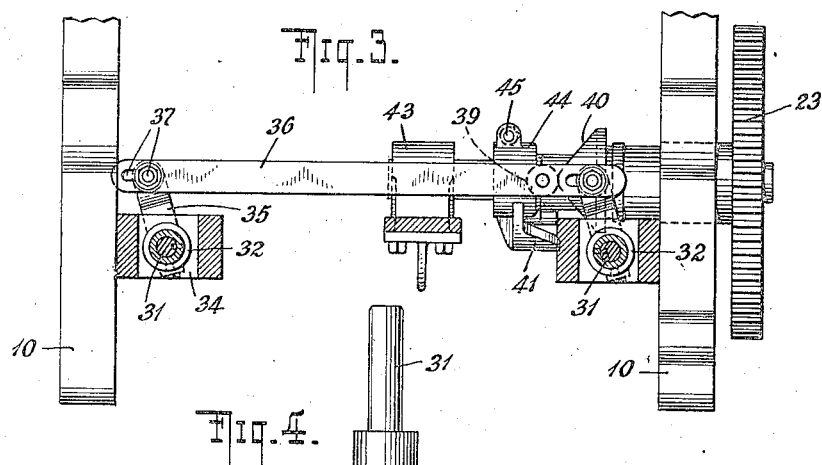
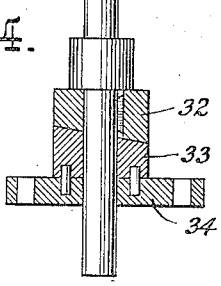
WITNESS
INVENTOR
GRAHAM H. JACKSON
BY
ATTORNEYS Patented July 10, 1923.

1,461,529

UNITED STATES PATENT OFFICE.

GRAHAM H. JACKSON, OF NEWARK, NEW JERSEY, ASSIGNOR TO UNIVERSAL TOBACCO MACHINE CO., OF NEW YORK, N. Y., A CORPORATION OF NEW YORK.

TOBACCO-LEAF MACHINE.

Application filed December 24, 1921. Serial No. 524,675.

*To all whom it may concern:*

Be it known that I, GRAHAM H. JACKSON, a citizen of the United States of America, and resident of Newark, county of Essex, State of New Jersey, have invented certain new and useful Improvements in Tobacco-Leaf Machines, of which the following is a specification.

My invention relates to machines for treating tobacco leaves by rolling, crushing or corrugating the leaf stem without injury to the leaf and in such a manner that the stem may be used for the purposes of leaf tobacco and thereby avoiding the necessity for stripping the leaf. The object of the invention is to provide such a machine, arranged to automatically discontinue the treatment of the stem at a predetermined point thereof, whereby a selected portion of said stem remains in its original untreated condition. Other more specific objects of the invention will appear from the description hereinafter and the features of novelty will be pointed out in the appended claims.

Figure 1:
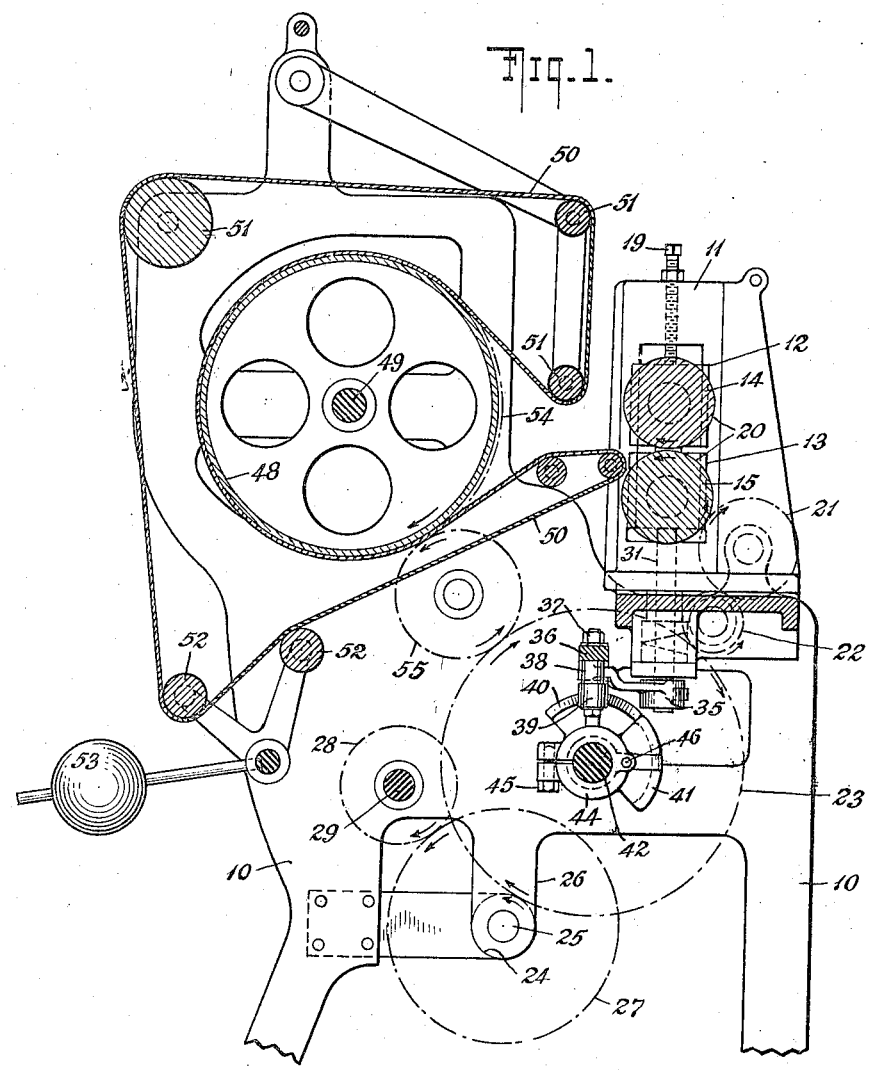
Figure 5:
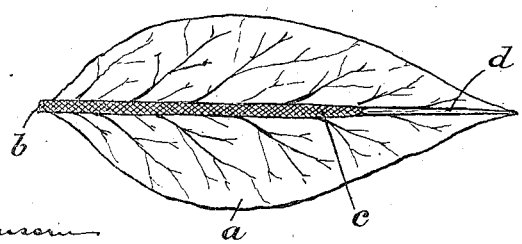

In the accompanying drawings, which illustrate an example of my invention without defining its limits, Figure 1 is a sectional elevation taken approximately on the line 1—1 of Fig. 2; Fig. 2 is a fragmentary front elevation partly in section; Fig. 3 is a fragmentary horizontal section on the line 3—3 of Fig. 2; Fig. 4 is a detail view partly in section, and Fig. 5 illustrates an example of the tobacco leaf after having been treated by the machine.

As illustrated in the drawings, the machine comprises a frame 10 on which upright guides 11 of suitable construction are positioned in opposed registry with each other, as shown in Fig. 2. Bearing blocks 12 and 13 are slidably mounted in the guides 11 and provide bearings for the upper and lower stem-treating rolls 14 and 15. The latter may be of any surface construction suitable to the particular method of treatment of the stem which is preferred, and in the illustrated example are provided with intermediate, knurled or corrugated sections 16 and 17, as shown in Fig. 2. The bearing blocks 12 and 13, and consequently the rolls 14 and 15 are acted upon by intermediate springs 18 in a manner tending to press said rolls apart, set screws 19 being provided to arrest the sliding movements of the blocks 12 in an upward direction and being adjustable in the guides 11, as illustrated in Fig. 2. The rolls 14 and 15 may be positively driven in any convenient manner as, for instance, by means of pinions 20 operatively connected with said rolls and with each other, one of said pinions 20 being in mesh with a pinion 21 rotatably mounted on the frame 10 and itself in mesh with a pinion 22 also rotatably mounted upon said frame 10. The pinion 22, in turn, engages a gear 23 which meshes with a pinion 24 carried by a shaft 25 journalled in brackets 26 of the frame 10. The shaft 25 carries also a gear 27 which meshes with a gear 28 carried by the main shaft 29; the latter may be rotatably operated in any convenient manner, as by means of a pulley 30 with which a driving belt is operatively connected in the customary manner.

For the purpose of automatically discontinuing the treatment of the tobacco leaf stem at a predetermined point thereof as it passes through the machine, the rolls 14, 15 are automatically adjusted to inoperative positions with respect to each other. In the illustrated example this is accomplished by mounting the blocks 13 upon rods 31 vertically slidable in the guides 11 and each carrying a helical cam member 32, as shown in Fig. 2. Each cam member 32 is arranged in operative co-relation to a stationary helical cam member 33 fixed upon a plate 34 secured upon the frame 10 at the proper point thereof. The rods 31 project downwardly beyond the stationary helical cam members 33 and carry levers 35, the free ends of which are secured to a link 36, preferably through the medium of a slotted connection 37, so as to provide for adjustment of said link and levers relatively to each other. A stud 38 depends from the link 36 and carries a roller 39 adapted to co-operate with cams 40 and 41 to reciprocate the link 36, as will appear more fully hereinafter. The cams 40 and 41 are carried by a shaft 42 journalled in a bearing bracket 43 and in the frame of the machine, said shaft 42 carrying also the gear 23 previously referred to. In a preferred construction and for the purpose of adjustment, the cam 41 is movable lengthwise of the shaft 42 in directions toward and away from the cam 40 and also rotatable relative to said shaft 42 and for these purposes may be provided with a split collar 44 clamped upon the shaft 42 by means of a bolt 45. In order to arrest the adjustment of the cam 41 toward the cam 40 at a predetermined point to prevent said cams from being brought so close together that the roller 39 would not properly pass between the same, one of said cams may be provided with a pin 46 adapted to enter a recess 47 in the other cam and of sufficient length to remain in said recess throughout the entire range of adjustment of said cam 41; in the illustrated example the pin 46 is mounted upon the cam 40 and the recess 47 is located upon the cam 41. In order that this arrangement may not interfere with the rotative adjustment of the cam 41, the recess 47 is of elongated form, curved about the shaft 42 as a centre and of suitable dimensions to permit the desired adjustment of said cam 41.

In the preferred construction the machine, of which the rolls 14 and 15 constitute a part, includes also a booking drum 48 mounted upon a shaft 49 and cooperating with a booking apron to receive and book the tobacco leaf after the stem has been treated by said rolls. The booking apron 50 passes over rolls 51 in the customary manner, being held under the desired tension by means of tension rolls 52 and a weight 53 in the well known way. The booking drum 48 may be driven through the medium of a gear 54 and pinion 55, which meshes with the previously mentioned gear 23.

In practice, with the parts in the position illustrated in Fig. 2, the intermediate sections 16 and 17 of the rolls 14 and 15 are in their operative positions and in surface contact with each other. In this position of the parts, the leaf $a$ is introduced into the machine by inserting the butt end $b$ of the stem between the intermediate sections 16 and 17 and is consequently passed between the same as the rolls are operated through the medium of the pinions 20, etc. As the stem thus passes between the sections 16 and 17, it is treated thereby and is rolled, crushed or corrugated in accordance with the surface structure of the roll sections 16 and 17. As the mechanism operates, the cam 41 will finally engage the roller 39 and will force the same toward the right in Figs. 2 and 3 and correspondingly actuate the levers 35. This movement of the levers 35 will be transmitted to the helical cams 32 and will rotate the same relatively to the helical cams 33 in such a manner as to cause the roll 15 and its intermediate section 17 to drop away from the roll 14 and its intermediate section 16. The action of the sections 16 and 17 upon the tobacco leaf stem will therefore be discontinued at whatever point in the length of said stem the described separation of the intermediate sections of said rolls takes place. This point may be predetermined with respect to the length of the tobacco leaf stem by properly proportioning the various gears or by properly setting the cam 41, as will appear more fully hereinafter. For instance, as shown in Fig. 5, the stem of the tobacco leaf may be corrugated or otherwise treated for the major portion of its length, as indicated at $c$, and then permitted to remain in its normal condition for the rest of its length, as indicated at $d$ of Fig. 5. As the mechanism continues to operate, the cam 40 will finally engage the roller 39 and force the link 36 toward the left in Figs. 2 and 3 and thus swing the levers 35 in the same direction. This will rotate the helical cams 32 in a return direction and relatively to the helical cams 33 in a manner to raise the roll 15 and its intermediate section 17 and thereby to restore the same into operative relation to the roll 14 and its section 16, whereupon the machine is ready to receive another leaf. By rotatably adjusting the cam 41 upon the shaft 42, the distance between the operating points of the two cams 40 and 41 may be varied to correspondingly change the point in the operation at which the rolls are separated; in this way, as before indicated, a greater or lesser portion of the stem will pass between the rolls 14 and 15 and be acted on thereby before the crushing action of the sections 16 and 17 is discontinued. In some cases, it may be desirable to vary the degree of treatment to which the tobacco leaf stem is subjected by the sections 16 and 17 either throughout the entire length of said stem or through only a part of the length thereof, as previously described; that is to say, it may, for instance, be desirable to crush down the butt or heavy portion of the stem very thin, so that the fibres are entirely broken up and to break down the fibres of the balance of the stem to a lesser extent so that, while the entire stem would be crushed, there would be a variation in the degree of crushing throughout different portions of the stem. This may be accomplished by adjusting the cam 41 toward the left on the shaft 42 so that, at a predetermined point in the operation, the roll 15 and its intermediate section 17 will be dropped away from the roll 14 and its intermediate section 16 to a limited extent and so that said sections 16 and 17 are still in operative relation with each other, but not in actual contact. The pressure of the sections 16 and 17 upon the stem of the tobacco leaf will consequently be lighter than when such sections 16 and 17 are in surface engagement with each other, with the result that whatever portion of the stem passes between the sections 16 and 17 subsequent to the described separation of the rolls 14 and 15 will only be lightly treated thereby.

If it is desired to crush or treat the stem uniformly throughout its entire length, the cam 41 may be adjusted to the left in Fig. 1 to a position upon the shaft 42 in which said cam 41 will have no operative effect upon the roller 39, so that the link 36 will not be reciprocated and the cams 32 will not be operated; the sections 16 and 17 of the rolls 14 and 15 will consequently remain in engagement with each other throughout the operation of the machine.

If the booking forms part of the machine, the tobacco leaf, after having passed between the rolls 14 and 15, will be received upon the booking apron 50 and will be booked thereby upon the drum 48 in the customary way.

Any suitable arrangement may be used for enabling the operator to stop the mechanism during an operation thereof, such means being well known in the art and therefore requiring no illustration.

It will be understood that the adjustment of the roll 15 and its intermediate section 17 toward and away from the roll 14 and its intermediate section 16, when the same takes place, is such that the pinions 20 and 21 remain always in operative engagement with each other, said pinions being arranged and constructed in such a manner that this result is obtained.

The machine is extremely simple in construction and reliable in operation and serves to treat the tobacco leaf stem throughout such parts thereof as require treatment and to automatically discontinue such treatment at that point of the stem beyond which no treatment is required. In this way the entire stem may be treated or predetermined portions thereof may be subjected to different degrees of treatment, as may be necessary, and in any case, the relatively thick, tough portions of the stem may be rendered combustible and capable of being used for the purposes of leaf tobacco while the delicate portions of such stem, which require no such treatment, and the surrounding parts of the leaf, may be protected against injury; in this way the tedious and wasteful stripping of the tobacco leaf may be dispensed with.

Various modifications in the specific form shown and described may be made within the scope of the claims without departing from the spirit of my invention.

I claim:

1. In a tobacco leaf-treating machine, the combination of stem-treating rolls and means for automatically moving one of said rolls out of operative relation with the other at a predetermined point in the treatment operation.

2. In a tobacco leaf-treating machine, the combination of stem-treating rolls located in superimposed relation and mechanism for automatically raising and lowering the lower roll toward and away from the upper roll.

3. In a tobacco leaf-treating machine, the combination of an upper roll having an intermediate stem-treating section, a lower roll having an intermediate stem-treating section arranged to co-operate with said first-named stem-treating section to treat the stem of a tobacco leaf, vertically slidable rods carrying said lower roll and mechanism for automatically raising and lowering said rods whereby said intermediate section of the lower roll is moved out of operative relation with the intermediate section of the upper roll at a predetermined point in the operation of the machine.

4. In a tobacco leaf-treating machine, the combination of an upper roll having an intermediate stem-treating section, a lower roll having an intermediate stem-treating section arranged to co-operate with said first-named stem-treating section to treat the stem of a tobacco leaf, vertically slidable rods carrying said lower roll, movable helical cams located upon said rods, stationary helical cams in co-operative relation to said movable helical cams, and mechanism for rotating said movable helical cams relatively to said stationary helical cams whereby said rods are vertically adjusted to move the intermediate section of said lower roll toward and away from the intermediate section of said upper roll at predetermined points in the operation of the machine.

5. In a tobacco leaf-treating machine, the combination of an upper roll having an intermediate stem-treating section, a lower roll having an intermediate stem-treating section arranged to co-operate with said first-named stem-treating section to treat the stem of a tobacco leaf, vertically slidable rods carrying said lower roll, movable helical cams located upon said rods, stationary helical cams in co-operative relation to said movable helical cams, levers secured to said movable helical cams, a link connecting said levers, and means for reciprocating said link whereby said movable helical cams are rotated relatively to said stationary helical cams to vertically adjust said rods whereby said lower roll and its intermediate section is raised and lowered relatively to said upper roll and its intermediate section.

6. In a tobacco leaf-treating machine, the combination of an upper roll having an intermediate stem-treating section, a lower roll having an intermediate stem-treating section arranged to co-operate with said first-named stem-treating section to treat the stem of a tobacco leaf, vertically slidable rods carrying said lower roll, movable helical cams located upon said rods, stationary helical cams in co-operative relation to said movable helical cams, levers secured to said movable helical cams, a link connecting said levers, and rotatable cams for reciprocating said link to rotate said movable helical cams whereby said rods are vertically adjusted to move said lower roll and its intermediate section toward and away from said upper roll and its intermediate section.

7. In a tobacco leaf-treating machine, the combination of an upper roll having an intermediate stem-treating section, a lower roll having an intermediate stem-treating section arranged to co-operate with said first-named stem-treating section to treat the stem of a tobacco leaf, vertically slidable rods carrying said lower roll, movable helical cams located upon said rods, stationary helical cams in co-operative relation to said movable helical cams, levers secured to said movable helical cams, a link connecting said levers, and rotatable cams for reciprocating said link to rotate said movable helical cams whereby said rods are vertically adjusted to move said lower roll and its intermediate section toward and away from said upper roll and its intermediate section, one of said cams being adjustable toward and away from the other to vary the extent to which said lower roll and its intermediate section is moved toward said upper roll and its intermediate section.

In testimony whereof I have hereunto set my hand.

GRAHAM H. JACKSON.